United States Patent
Periyagaram et al.

(10) Patent No.: US 9,715,348 B2
(45) Date of Patent: Jul. 25, 2017

(54) SYSTEMS, METHODS AND DEVICES FOR BLOCK SHARING ACROSS VOLUMES IN DATA STORAGE SYSTEMS

(71) Applicant: NetApp, Inc., Sunnyvale, CA (US)

(72) Inventors: Subramaniam Periyagaram, Sunnyvale, CA (US); Ananthan Subramanian, Sunnyvale, CA (US); Manish Katiyar, Santa Clara, CA (US)

(73) Assignee: NETAPP, INC., Sunnyvale, CA (US)

( * ) Notice: Subject to any disclaimer, the term of this patent is extended or adjusted under 35 U.S.C. 154(b) by 6 days.

(21) Appl. No.: 14/848,482

(22) Filed: Sep. 9, 2015

(65) Prior Publication Data

US 2017/0068472 A1 Mar. 9, 2017

(51) Int. Cl.
G06F 3/06 (2006.01)
G06F 17/30 (2006.01)

(52) U.S. Cl.
CPC .......... *G06F 3/0619* (2013.01); *G06F 3/065* (2013.01); *G06F 3/067* (2013.01); *G06F 3/0608* (2013.01); *G06F 17/30088* (2013.01); *G06F 17/30153* (2013.01)

(58) Field of Classification Search
CPC .......... G06F 3/06; G06F 17/30; G06F 3/0619; G06F 3/0608; G06F 17/30153; G06F 3/067; G06F 17/30088; G06F 3/065
See application file for complete search history.

(56) References Cited

U.S. PATENT DOCUMENTS

| | | | |
|---|---|---|---|
| 5,819,292 A | 10/1998 | Hitz | |
| 6,289,356 B1 | 9/2001 | Hitz | |
| 7,155,460 B2 | 12/2006 | McGovern | |
| 7,162,486 B2 | 1/2007 | Patel | |
| 7,231,412 B2 | 6/2007 | Hitz | |
| 7,366,834 B2 | 4/2008 | McGovern | |
| 7,590,807 B2 | 9/2009 | McGovern | |
| 7,930,493 B1 | 4/2011 | McGovern | |
| 8,332,362 B2 | 12/2012 | McGovern | |
| 8,600,949 B2* | 12/2013 | Periyagaram | G06F 3/0608 707/664 |
| 2005/0246397 A1* | 11/2005 | Edwards | G06F 17/30067 |
| 2014/0344539 A1* | 11/2014 | Gordon | G06F 3/065 711/162 |

* cited by examiner

*Primary Examiner* — David X Yi
*Assistant Examiner* — Zubair Ahmed
(74) *Attorney, Agent, or Firm* — Nixon Peabody LLP; Khaled Shami

(57) ABSTRACT

Presented herein are mass data storage systems, file system protocols, non-transitory machine readable devices, and methods for storing data blocks in data file systems. Methods for compressing snapshot data in a data file system are disclosed which include: loading a snapshot file with one or more data blocks, the snapshot representing a state of the data file system at a point in time; determining if at least one of the snapshot data blocks is less than a predetermined byte value; responsive to a snapshot data block having a size that is less than the predetermined byte value, identifying a packed block configured to store data chunks from plural distinct snapshots and having available sufficient storage space to store the snapshot data block; and adding to the packed block the snapshot data block and lost-write context information corresponding to the snapshot data block.

20 Claims, 4 Drawing Sheets

SYSTEMS, METHODS AND DEVICES FOR BLOCK SHARING ACROSS VOLUMES IN DATA STORAGE SYSTEMS

TECHNICAL FIELD

The present disclosure relates generally to mass data storage networks and data storage filing systems. More particularly, aspects of this disclosure relate to data storage network configurations, file system protocols, and methods for compressing data in snapshots and for providing block sharing among data files.

BACKGROUND

Mass data storage systems are used for many purposes, including storing user and system data for data processing, backup and transmission applications. A typical mass storage system includes numerous computer disk drives that cooperatively store data, for example, as a single logically contiguous storage space, often referred to as a volume or a logical unit. One or more such volumes/logical units may be configured in a storage system. The storage system therefore performs much like a single computer disk drive when viewed by a host computer system. For example, the host computer system can access data of the storage system much like it would access data of a single internal disk drive, in essence, without regard to the substantially transparent underlying control of the storage system.

A mass storage system may include one or more storage modules with each individual storage module comprising multiple disk drives coupled to one or more storage controllers. In one typical configuration, a storage module may be coupled through its storage controller(s) directly to a host system as a standalone storage module. Typical storage controllers include significant cache memory capacity to improve performance of the I/O operation. Write requests may be completed when the supplied data is written to the higher speed cache memory. At some later point, the data in cache memory may be flushed or posted to the persistent storage of the storage modules. In a standalone configuration, it is common to enhance reliability and performance by providing a redundant pair of storage controllers. The redundant pair of controllers enhances reliability in that an inactive storage controller may assume control when an active controller is sensed to have failed in some manner.

In another standard system configuration, a storage module may be part of a larger storage network or "cluster." For a cluster-type architecture, multiple storage modules and corresponding storage controllers are typically coupled through a switched network communication medium, known as a "fabric," to one or more host systems. This form of storage module system is often referred to as a Storage Area Network (SAN) architecture and the switching fabric is, concomitantly, referred to as a SAN switching fabric. In such a clustered configuration, it is common that all of the storage controllers exchange coherency information and other information for load balancing of I/O request processing and other control information. Such control information may be exchanged over the same network fabric that couples the storage controllers to the host systems (e.g., a "front end" connection) or over another fabric that couples the storage controllers to the storage modules (e.g., a "back-end" connection).

A network storage appliance (e.g., a storage server) is typically a discrete special-purpose computer that provides file services relating to the organization of information on the storage devices of a mass data storage system. The network storage appliance, or "filer," includes integrated software (firmware) and an operating system that implements a file system to logically organize information, for example, as a hierarchical structure of directories and files on the storage devices (e.g., storage disks). Each "on-disk" file may be implemented as a set of disk blocks configured to store information, such as text; the directory, by comparison, may be implemented as a specially formatted file in which information about other files and directories are stored.

On-disk format representation of some file systems is block-based using, for example, four kilobyte (KB) blocks ("4K block") and index nodes to describe the files. Index nodes, which are informally referred to as "inodes," are data structures used to store information, such as metadata, about a file. Information contained in a typical inode may include, e.g., file ownership data, file access permission data, file size, file type, and on-disk location of the data for the file. The file system uses an identifier with an inode number, known as a "file handle," to retrieve an inode from a disk. The file system also uses metadata files to store metadata describing the layout of its file system. An example of on-disk format structure of one standard file system is described in U.S. Pat. No. 5,819,292 to David Hitz et al., which is incorporated herein by reference in its entirety and for all purposes.

A "snapshot" of a file system captures the contents of the files and directories in the file system at a particular point in time. A conventional snapshot does not use disk space when it is initially created, is typically a virtual read-only file, and is designed so that many different snapshots can be created for the same file system. Unlike some file systems that create a clone of the file system by duplicating the entire inode file and all of the indirect blocks, conventional snapshots duplicate only the inode that describes the inode file. Such snapshots allow users of the file system to recover earlier versions of a file, for example, following an unintended deletion or modification of the file. In addition, the contents of a snapshot can be copied to another storage device or medium to provide a backup copy of the file system. A snapshot can also be copied to another file server and used as a replica. Some file systems include a copy-on-write snapshot mechanism. Snapshot block ownership in such systems is generally recorded by updating the block's entry in a blockmap file, which is a bitmap indicating which blocks are in-use and which are free for use. Additional information regarding snapshot files can be found, for example, in U.S. Pat. No. 6,289,356 B1, which is incorporated herein by reference in its entirety and for all purposes.

One problem with creating a conventional snapshot is the requirement for additional file system metadata and, thus, additional storage space in the active file system to keep track of which blocks the snapshot occupies. This is inefficient both in its use of storage space and in the time needed to create the snapshots. Another problem with conventional snapshots is that, once data has been captured in a snapshot, that data becomes "trapped" and, thus, modifications to trapped data are not allowed. This restriction is also applicable to any metadata holding that information in the flexible volume (flexvol). Both the virtual volume block numbers (VVBNS) and the physical volume block numbers (PVBNS) become trapped, which prevents a reduction in the footprint of the snapshot data. Consequently, it is no longer possible to modify the block numbers which were assigned previously to any files which are trapped in a snapshot in the flexvol. In addition, conventional filing systems do not allow space to be shared among unique data blocks or data to be shared across multiple flexible volumes. There is therefore a need for improved techniques for more quickly and efficiently capturing the contents of the files and directories in a file system at a particular point in time.

Figure 1:
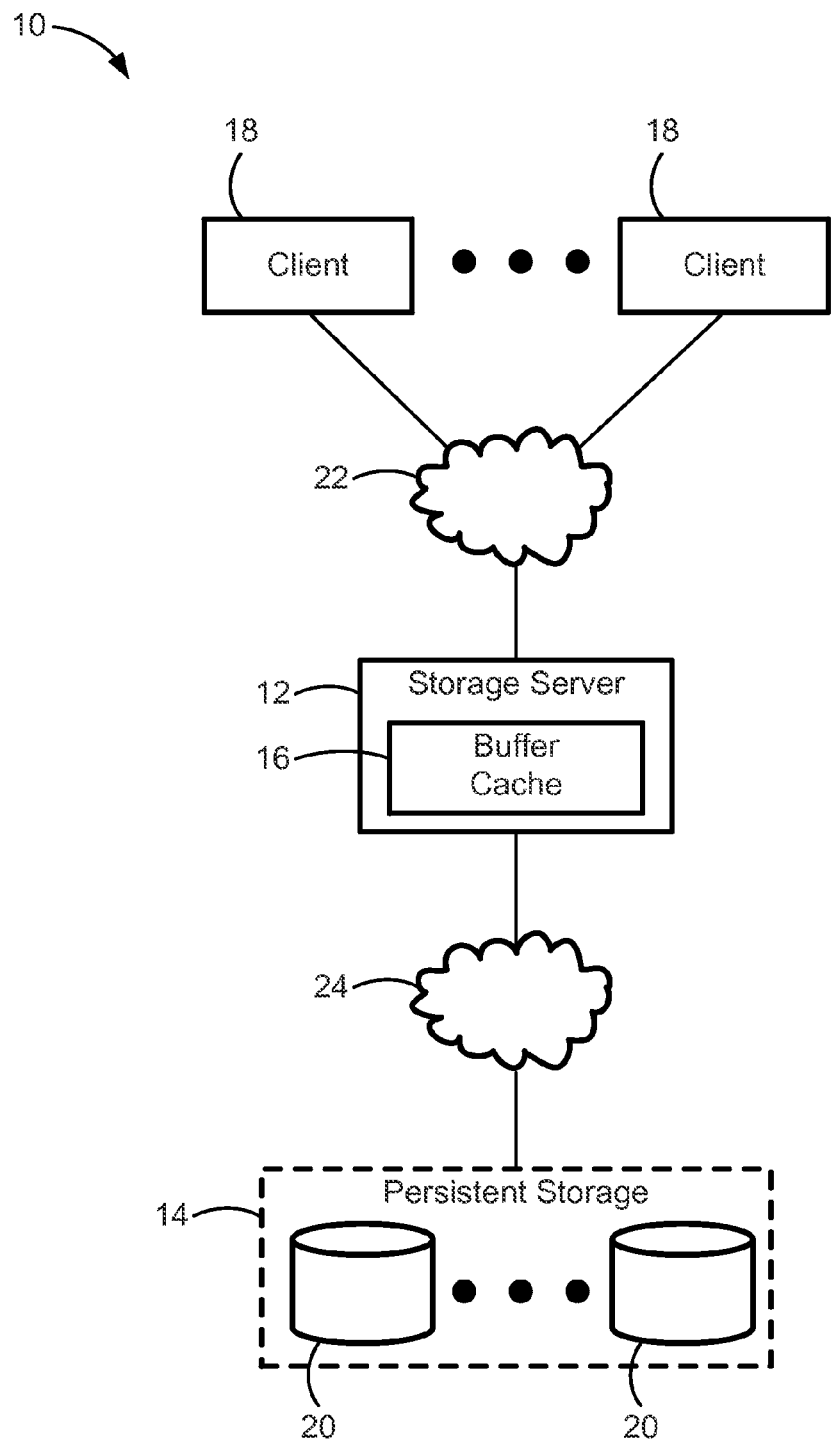
FIG. 1 is a schematic diagram illustrating a representative mass data storage file system in accordance with aspects of the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, combinations and subcombinations, and alternatives falling within the spirit and scope of the disclosure as defined by the appended claims.

DETAILED DESCRIPTION OF ILLUSTRATED EXAMPLES

This disclosure is susceptible of embodiment in many different forms. There are shown in the drawings, and will herein be described in detail, representative embodiments with the understanding that the present disclosure is to be considered as an exemplification of the principles of the present features and is not intended to limit the broad aspects of the disclosure to the embodiments illustrated. To that extent, elements and limitations that are disclosed, for example, in the Abstract and Detailed Description sections, but not explicitly set forth in the claims, should not be incorporated into the claims, singly or collectively, by implication, inference or otherwise. For purposes of the present detailed description, unless specifically disclaimed or logically prohibited: the singular includes the plural and vice versa; and the words "including" or "comprising" or "having" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example."

Aspects of this disclosure are directed to file system protocols for packing the data in and, thus, reducing the physical storage space required for a snapshot. Data in a snapshot file can be packed (or "crunched") by identifying multiple snapshots within the system that each comprise a chunk of data that is less than four kilobyte (KB) (e.g., less than 4096 bytes of data), and relocating these data chunks to a single "packed" block instead of allocating an entire 4 KB block individually for each snapshot. Recognizing that many file systems are not capable of indirectly modifying the virtual volume (vvol) indirect container with the packed block physical volume block number (PVBN), a container with indirect entries corresponding to all of the shared virtual volume block numbers (VVBNS) is updated to hold the packed block PVBN while the virtual volume indirect PVBN is freed. Subsequently, entries in the vvol indirect container can be freed by running a fix-up scanner to avoid the redirection costs associated with future read requests.

As will be explained in further detail below, many data file systems implement multiple flexible volumes (flexvols) in an analogous number of volume container files that contain the data blocks for the corresponding flexible volumes. For instance, one such container file can hold data for a complete flexvol. Internally, for any given block of data, there can be provided at least two ways to reach the block (e.g., for a read or write operation): via block pointers stored as "indirects" directly inside the flexvol container; or via walking pointers inside the container file. If there are two copies (ways) to reach the data block, one of the copies can "go stale" and, in those cases, the authoritative way to reach the data is by following the container indirect block pointers. Since many data file systems do not allow any modifications of indirect blocks in a flexvol when it is trapped in a snapshot, the block pointer in a container is modified to intentionally create a stale mapping in flexvol indirect container. The data file system will identify this condition and select the correct block from the container indirect entry. When the packing code creates a stale mapping in the flexvol indirect container, a "fix-up scanner" process can be employed to bring both of the mappings in sync.

Aspects of this disclosure are also directed to file system protocols for packing multiple data files containing unique data and residing in different flexible volumes. Enabling the file system with packed-block capabilities which allows data blocks to be addressed at a byte-address level of granularity, the system can store VVBNS corresponding to different blocks in the same physical block. Each block contains a header with metadata for each of the files which share this packed block. This header contains the VVBN and other information related to the file blocks. To enable the sharing of blocks across different flexvols, additional metadata in the form of lost-write context is stored in the block header in a single block. This lost write context can also store "buftree" identification information of the volumes, which is unique to a given volume in the file storage system. Read requests originating from the participating volumes provide a unique lookup context. This lookup context matched against the stored lost-write context and is used to verify and identity the data belonging to each individual flexvol. Using one or more of the disclosed techniques, the file storage system can realize space savings, reduced latency, and increased efficiency.

Referring now to the drawings, wherein like reference numerals refer to like features throughout the several views, there is shown in FIG. 1 a representative mass data storage file system, designated generally at 10, for performing filing operations in accordance with aspects of the present disclosure. The system 10 includes, but is certainly not limited to, one or more host storage servers 12 communicatively coupled to one or more data storage modules 14, each of which includes, for example, multiple non-volatile mass storage devices 20. Also communicatively coupled to the host storage server(s) 12 through a network interconnect 22 are one or more clients 18. The network interconnect 22 may be, for example, a local area network (LAN), a wireless local area network (WLAN), a wide area network (WAN), a metropolitan area network (MAN), a global area network, a distributed computer system, such as the Internet, a Fibre Channel fabric, or any combination of such interconnects. Each of the clients 18 may take on various forms including, as some non-limiting examples, a server-class computer, a networked workstation, a personal computer (PC), a handheld computing device, and the like. It should be readily understood that the system 10 illustrated in FIG. 1 is merely provided as an exemplary application by which the various inventive aspects and features of this disclosure can be applied. Moreover, only selected components of the system 10 have been shown and will be described in additional detail hereinbelow. Nevertheless, the systems and devices discussed herein can include numerous additional and alternative features, and other well-known peripheral components, for example, for carrying out the various methods and functions disclosed herein.

Each storage server 12 is operable, in whole or in part, as a network storage appliance or filer configured as a special-purpose computer to manage storage of data in at least one of the one or more storage modules 14. Storage server 12 receives and responds to various read requests and/or write requests from one or more of the clients 18 directed to data stored in, or to be stored in, the storage module(s) 14. A storage server 12 communicates with a storage module 14 over a network interconnect 24. Server 12 may comprise a central processing unit, a main memory device, a network adapter, and a storage adapter, all of which are interconnected by a system bus. The server 12 also includes an operating system that implements the herein described file system to logically organize information, for example, as a hierarchical structure of directories and files on the disks. Each server can be implemented on one or more server class computers, which can be subcomponents of a computer hardware server system, with sufficient memory, data storage, and processing power and, in some embodiments, the capabilities to run a server class operating system (e.g., GNU/Linux, SUN Solaris, Microsoft Windows OS, etc.). The servers can each be part of a logical group of one or more servers, such as a server farm or server network.

As is typical in large-scale systems, the application software can be implemented in components, with different components running on different server computers, on the same server, or any logical combination thereof. Interconnect 24 may support any of various types of communication protocols, such as Ethernet, iWarp, Fibre Channel Virtual Interface (FCVI), InfiniBand, Peripheral Component Interconnect express (PCIe), and the like. Like interconnect 22, interconnect 24 may comprise a LAN, a WLAN, a WAN, a MAN, a global area network, a distributed computer system, a Fibre Channel fabric, or any combination thereof. Interconnects 22 and 24 can each be a wired or a wireless network, or a combination of wired and wireless technology. Communication can take place through any now-known or hereinafter developed media, such as telephone lines (e.g., Dial-Up), local area network (LAN) or wide area network (WAN) links (e.g., Ethernet, T(X) lines, X.25, etc.), broadband connections (e.g., Integrated Service Data Network (ISDN), Frame Relay, etc.), wireless links (e.g., infrared, Bluetooth®, WiFi or WLAN), cellular networks, and so on.

Mass storage devices 20 of each storage module 14 can take on various now-known or hereinafter developed forms, including non-volatile solid-state memory, such as flash memory or other read-only memory (ROM); optionally or alternatively, a storage module may contain conventional electronic, magnetic or optical disks or tape drives. These mass storage devices 20 can be organized as one or more Redundant Array of Independent Device (RAID) groups, in which case the storage server(s) 12 accesses the storage module(s) 14 using one or more RAID algorithms. The illustrated storage server 12 also includes an optional internal buffer cache 16, which can be implemented as DRAM, for example, or, the buffer cache 16 can be implemented as non-volatile solid-state memory, including flash memory.

The storage server(s) 12 may provide file-level data access service to clients 18, such as commonly done by a storage server in a network attached storage (NAS) environment (i.e., a "filer"), or block-level data access service such as commonly done by a storage server in a storage area network (SAN) environment. A storage server 12 may be operable to provide both file-level data access service and block-level data access service, for some network configurations. Further, although the storage server 12 is illustrated as a single unit in FIG. 1, the storage server 12 can have a distributed architecture. For example, the storage server 12 can include a physically separate network element and data element that communicate over a fabric interconnect.

The file system has the capability to generate a snapshot of its active file system. An "active file system" is a file system to which data can be both written and read, or, more generally, an active store that responds to both read and write I/O operations. It should be noted that "snapshot" is used for purposes of this description to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of a write anywhere file layout file system, a PCPI is an active file system image that contains complete information about the file system, including all metadata. A PCPI can also include other information (e.g., metadata) about the active file system at the particular point in time for which the image is taken.

Figure 2:
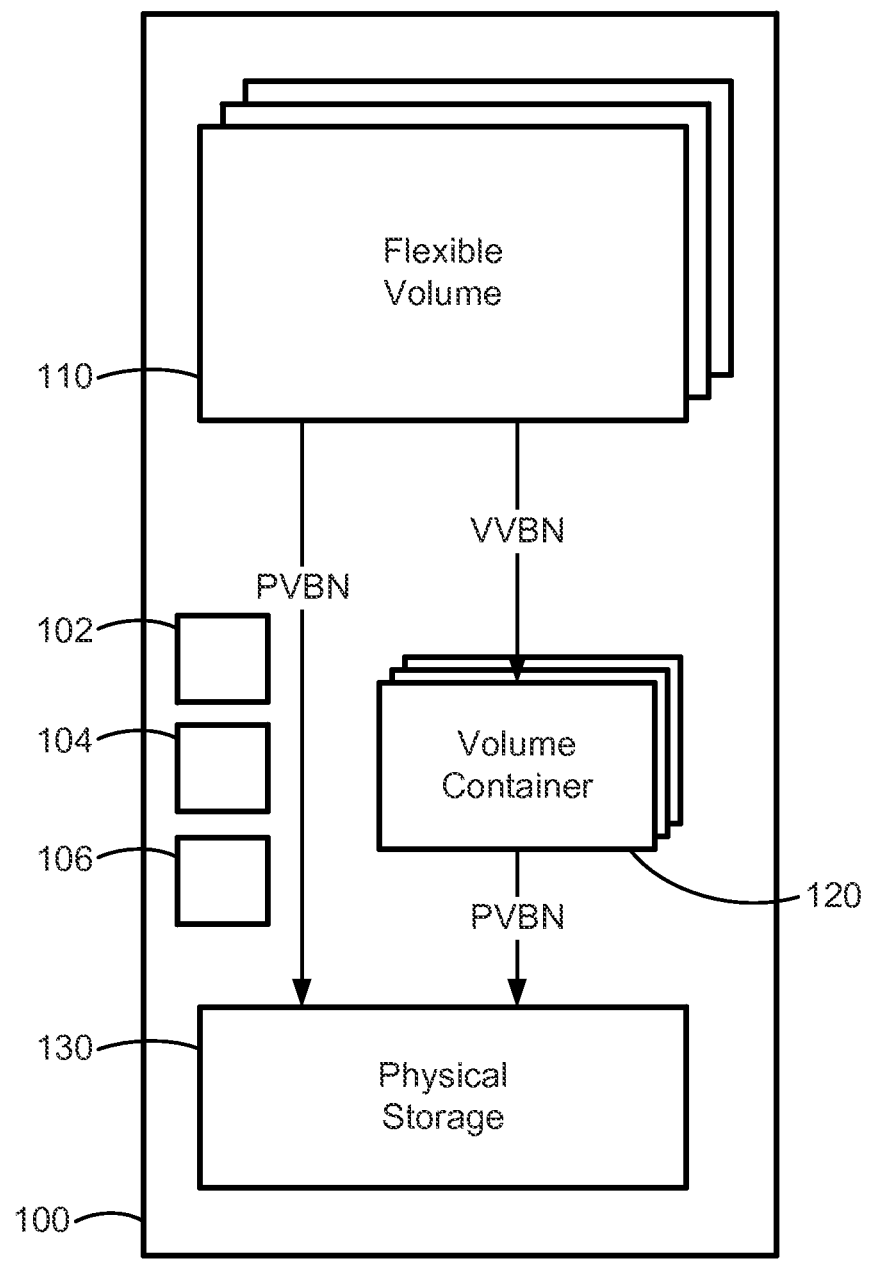
FIG. 2 is a schematic diagram illustrating a representative filing system configuration in accordance with aspects of the present disclosure.

FIG. 2 schematically depicts a file system aggregate 100 that is representative of a file system configuration, such as a write anywhere file layout system configuration. The aggregate 100 can be managed by a network storage appliance, such as storage server 12 of FIG. 1, or other storage system filer. As described further herein, segments of the aggregate 100 can be implemented through an operating system software layer having an on-disk format representation that is block-based using, for example, four kilobyte data blocks (4K block) and using inodes to describe the data blocks. Aggregate 100 of FIG. 2 includes, for example, one or more flexible volumes 110, one or more volume containers 120, and physical storage 130. The aggregate 100 can be representative of a physical storage container that can store data in the file system. The filer administers and aggregates storage space in the physical storage devices, and presents the space in the physical storage devices as a "volume." Clients can then treat a single volume as though it were a single, large disk. Each block of the volume maps to a particular block of one of the storage devices and vice versa. Thus, a volume represents the storage capacity of a whole number of storage devices.

Flexible volume (flexvol) 110 is a logical volume that provides for virtualization of the allocation of volumes on physical storage 130. A filer can implement the flexible volume as a container file that is stored on the physical storage devices. By this means, multiple, independently managed flexible volumes 110 can share the same physical storage (e.g., physical storage 130). Blocks on the storage devices can be allocated to the flexvol container file as needed. The virtualization includes mapping between virtual volume block numbers (VVBNS), which are used by flexible volume 110, and physical volume block numbers (PVBNS), which are used by the aggregate 100 to access data stored in physical storage 130. A PVBN typically refers to disk blocks that have been abstracted into a single linear sequence in the aggregate. Each volume container 120 corresponds to a flexible volume 110. Volume container 120 contains all the data blocks for a corresponding flexible volume 110. As additional space is required on the flexible volume, the corresponding container file can be extended.

A block offset refers to a distance in blocks from the beginning of a storage object, such as a volume. Block addresses used within flexible volume 110, by contrast, refer to block offsets within volume container 120. Since a volume container 120 contains every block within a flexible volume 110, there are two ways to refer to the location of a particular block. The PVBN specifies the location of a block within the aggregate 100. The VVBN, by comparison, specifies the offset of the block within the container file. When a block in a file is requested, flexible volume 110 translates the block offset into a VVBN. The VVBN is then passed from flexible volume 110 to volume container 120. Volume container 120, in turn, translates the VVBN to a PVBN. The PVBN is then used to access the requested block in physical storage 130. When a PVBN is initially written, a block pointer for the PVBN in flexible volume 110 is written to include (e.g., in a cache) the PVBN for the VVBN. Thus, when the requested block is required, the flexible volume 110 can use the stored PVBN to access physical storage 130.

The file system aggregate 100 can define a file as a tree of indirect blocks. Each indirect block in the tree typically has a fixed span, i.e., a fixed number of entries, each pointing to another block in the tree. Extents are represented using an entry for each block within the extent. An extent generally refers to a contiguous group of blocks. As a result, the amount of indirect block metadata is typically linear with respect to the size of the file. Additionally, disk gardening techniques, such as segment cleaning, file reallocation, etc., may require caching PVBN pointers in VVBN blocks. In the illustrated example, the aggregate 100 is configured to use a predetermined block size for all internal operations. The aggregate 100, for example, uses 4 KB (e.g., 4096 bytes) blocks for both VVBN and PVBN, as do client-side file systems for file block numbers (FBN). Block boundaries are expected to occur every 4 KB from an initial offset (e.g., FBN 0). The file system can offset individual files based on these block boundaries, and take advantage of the block size and alignment to increase performance of input/output ("I/O") operations, for example, performing I/O operations that are a multiple of 4 KB and aligning these operations to the beginning of a file.

The file system comprises various modules for providing identification, collection, packing and writing functionalities to address "sub-4K" block chunks (i.e., chunks of data that are stored in a 4K block and constitute less than 4096 bytes). In the example illustrated in FIG. 2, the aggregate 100 includes a Feeder Module 102, which acts as a logical module to detect and prepare a collection of all sub-4K blocks that are possible candidates for packing. The individual code paths of data intended to be packed identify and tag sub-4K blocks appropriately at the front-end and, for example, when a message comes across potential blocks. Tagging a sub-4K block includes, for example, populating a newly added field in the block data with the size of valid data in the sub-4K block, and then enqueuing it to a global structure for a Packing Engine to find. In a write message code path which utilizes data packing, if the IO is on the last file block number (FBN) of the file, and the data length field (DataLen) indicates less than 4K (i.e., it is the tail end of the file), then such blocks are tagged. By comparison, in a compression code path which utilizes data packing, once the data has been compressed, a compression engine returns the length of the compressed block along with compressed data. If the compressed data length is less than 4 KB, those sub-4K blocks will be tagged. Moreover, in a truncate code path which utilizes data packing, a file is truncated in such a way that if the tail end does not completely fill a 4K block, the file system loads such buffers and completes a block zero ("bzero") for the rest of the block. In addition to zeroing out the rest of the block of memory ("bzeroing"), the truncate code path will also tag such blocks for packing. In a snapshot code path, as a snapshot block is read, if the tail ends of the files are not full 4K blocks, those bdatas will be tagged for packing.

Given a list of possible packing candidates obtained from the Feeder Module 102, a Packing Engine Module 104 reviews the list of candidates and creates one or more sets of candidates, wherein each set is "optimally packed" as close as possible to 4 KB of data. Standard combinatorial optimization smart algorithms can be used by Packing Engine Module 104 of FIG. 2 to efficiently pack the data in each packed block. Output from the Packing Engine Module 104 includes a list of 4K blocks to be packed, where each enumerated 4K block is associated with a distinct set and, thus, will contain data from multiple blocks which were received as input. Since file system workload during this stage of packing is directly proportional to the number of objects packed in a block, it is desirable for some implementations that the variance in number of packed objects between packed blocks be kept low. For example, if 10 sub-4K blocks are slated to be packed into two packed blocks, it is desirable to have the sub-4K blocks split into a set of 4 and a set of 6, for example, instead of sets of 2 and 8. The Packing Engine Module 104 also stores sufficient metadata information for each sub-4K block in a set, including lost-write context for each chunk in a packed block. This metadata contains information for reconstructing the data along with a unique signature of the data present in each chunk.

Each allocated block can be provided with a unique signature, also known as "lost-write context" of the block. Lost-write context is a manner of detecting if a requested write has failed (e.g., an existing protection mechanism within the file system to identify malfunctioning server disks). Along with the offset and length for each chunk, the file system protocol will store the lost-write context for each chunk in the packed block. This metadata information for each chunk is stored as an array at the start of the packed block. Any subsequent read destined for a chunk looks up the header for the signature match and, once the match has been found, returns the requested data to the client from the stored offset and length. For at least some embodiments, an aggregate level "refcount" is maintained for all such packed blocks. Each packed block in the aggregate is tracked by a bitmap, which indicates whether that block is in use. Since a packed block is used by multiple blocks, the refcount will indicate whether the block is in use as well as how many data chunks occupy the block. For at least some embodiments, only when all of the chunks in the packed block have been freed or overwritten can the packed block itself be freed. Header in the block for each chunk describes the data and is used to reconstruct the data back when needed. This enables the file system to address blocks at sub-4K granularity, and also helps in efficiently utilizing the physical space of disks.

For some implementations, data within multiple flexible volumes, including those in a common aggregate as well as those in discrete aggregates, can be packed together in a 4K packed block. Alternatively, only data for user files within the same virtual volume will be packed together in a single 4K packed block. For some implementations, files containing unique data can be packed together in a 4K packed block. Optionally, only data of similar nature will be packed together. Since the data chunks become a single entity when packed into a packed block, it is often desirable that all of the chunks in a packed block have the same kind of property. For instance, some implementations avoid packing hot and cold data together in the same packed block. As another example, some implementations avoid packing data which resides in a solid-state drive (SSD) with data that resides on hard disk drive (HDD).

A Block Writing Module 106, which may comprise a modified Consistency Point (CP) write allocation front-end component and/or a modified CP write allocation back-end component, is operable to do the packing work for the file system. Prior to said packing work, the Feeder Module 102 of FIG. 2 is operable to enqueue a list of relevant buffers and bdatas which require packing; this list can hang off the volume structure for any flexvol (e.g., a Flexible Volume 110 of FIG. 2) which participates in the CP packing operations. To ensure savings in disk writes, the CP components of Block Writing Module 106 typically write only a single packed block for 'N' packed chunks. Thus, writes to disk can be reduced by a factor of 'N' (where 'N' is the average packing factor during CP). In order to construct and write a packed block, Block Writing Module 106 allocates a VVBN for each packed chunk as this information is stored as lost-write information in the packed header for the packed chunk. The packed block is constructed after each of the constituting buffers has been assigned a corresponding lost-write context.

For the packing phase performed by Block Writing Module 106, at which write allocation of packed data occurs, a new CP pack phase is added before a normal clean phase, i.e., before any of the regular inodes are cleaned. From a front-end perspective, it appears as a CLEANING_NORMAL phase and can be visualized as having two sub-states: (a) a packing phase, and (b) a normal cleaning phase. A packed extent list can be representative of the work performed during the packing phase of the CP. Such packed extent lists can comprise multiple 4K blocks with one or more packed blocks in conjunction with one or more blocks which need packing. Each packed block holds a linked list of the constituting blocks, e.g., via wb_next2, which is used by CP code to walk over the extents. Each packed block also holds a linked list of the constituting blocks, e.g., via wb_next, which hangs off the packed buffer and is used to walk and prepare the packed contents.

At the start of the packing phase, each participating virtual volume that has a packing list to be cleaned is assigned a packing cleaner message. The job of this packing message is to walk through the list of buffers and try to fit those contents into packed data blocks. Similar to normal cleaning, this packing message prepares an extent list of the buffers which are going to get packed in each iteration of the message. At the start of each iteration, a 4K block of data is allocated which is going to hold contents of the packed block. The packing message then walks through the chunk list, picking each chunk from the front and deciding if it can fit into the current packed block. If the packed block has sufficient space to accommodate a picked chunk, a corresponding virtual volume buffer is added to the extent list. If the packed block does not have sufficient space to accommodate a picked chunk, then a new 4K block of data is allocated and the picked chunk is placed in the new block.

Once the extent list is prepared, CP code walks through each virtual volume buffer and allocates a respective VVBN to said buffer. While walking through the extent list in the VVBN allocation phase, when packed buffers are encountered, such buffers are skipped. A newly assigned VVBN is stored in the packing info structure which hangs off the virtual volume buffer. Once new VVBNS have been assigned to the buffers, cleaner code moves to the PVBN allocation phase. In the PVBN allocation phase, the extent list is traversed skipping virtual volume buffers that are encountered. When a packed block is encountered, a PVBN is allocated for the packed block. Along with allocating a PVBN for the packed block, the cleaner code walks through the linked list hanging off the packed buffer (e.g., linked via wb_next) for all the constituting virtual volume buffers. Cleaner code concomitantly retrieves newly assigned VVBNS for the virtual volume buffers. Once <V, P> pairs are provided for each chunk that is going into a particular packed block, appropriate headers in the packed block are updated and the packed block is sent to disk. This code also stamps the virtual volume buffers with a flag to denote that the contents for this block have been packed and already written to disk.

Once all of the buffers are packed, CP moves forward to the regular cleaning of dirty buffers and inodes. During regular cleaning of normal inodes, if CP comes across a virtual volume buffer whose contents have already been packed, instead of doing the actual work of cleaning and allocating a <V,P> pair, CP will "fake clean" the buffer. This fake cleaning includes updating the virtual volume parent and container with the packed <V, P> and then enqueuing the buffer in the waffinity write done queues. Write return for the packed blocks happens in RAID and the dummy buffer used to write the packed contents are thrown away on write completion. For CP WABE of the Block Writing Module 106, CP infrastructure allocates new PVBNS with a given refcount. Specifically, while the PVBN is allocated in this CP, the PVBN starts life with a given refcount of 'N' instead of 0. For example, a PVBN 'P' that is assigned to a packed block containing five chunks will have a refcount of 4 and active bitmap set to 1 as part of write allocation. This updating of refcount is completed along with setting active-map bit as part of an apply maps message. Aggregate's refcount file is NDX0 unlike virtual volume refcount file and will be cleaned in the allocation loop phase of CP along with active bitmap file. UPBC creation will also load necessary refcount files similar to other bitmap files during pbkt creation.

Since a packed block is shared by multiple VVBNS that can be within the same virtual volume or across multiple virtual volumes, a lost-write context operation is provided to uniquely identify the contents with respect to each VVBN. Each VVBN, from its logical context, is able to provide a unique signature as an expected context, and RAID is able to detect and match it against the block and return the data or, if it does not match, an error output. Logical virtual volume lost write context is stored as an array in the header of the 4K payload of the packed block. A new on-disk bit in the RAID context identifies a packed block and acts as a hint to RAID to look for the context in 4K payload as opposed to getting it from RAID context area. Since there is one instance of a <btid, vvbn> in a 4K block, context checking is completed by iterating over all the contexts present in the header. If a match is found, data is returned successfully. If none of the entries in the header match with the passed expected context, the buffer is marked either as a context mismatch or an appropriate block reallocation state transition is triggered. To further harden the block verification scheme and avoid looking into the 4K payload, where there is a possibility that a user data may look like a valid packed block header, packed blocks have a context of their own in the raid context area. This context can be made up of <Refcount_fileid, pvbn, bc_notflexvol_flag=0>. A first level check is done on this context. If the raid context has the packed bit set, then its raid context must have <Refcount_fileid, pvbn, bc_notflexvol_flag=0>. If it matches, RAID context is derived from the 4K payload. Additional information about the mass data storage system 10 and file system aggregate 100 can be found, for example, in U.S. patent application Ser. No. 14/815,601, which was filed on Jul. 31, 2015, and is incorporated herein by reference in its entirety and for all purposes.

Figure 3:
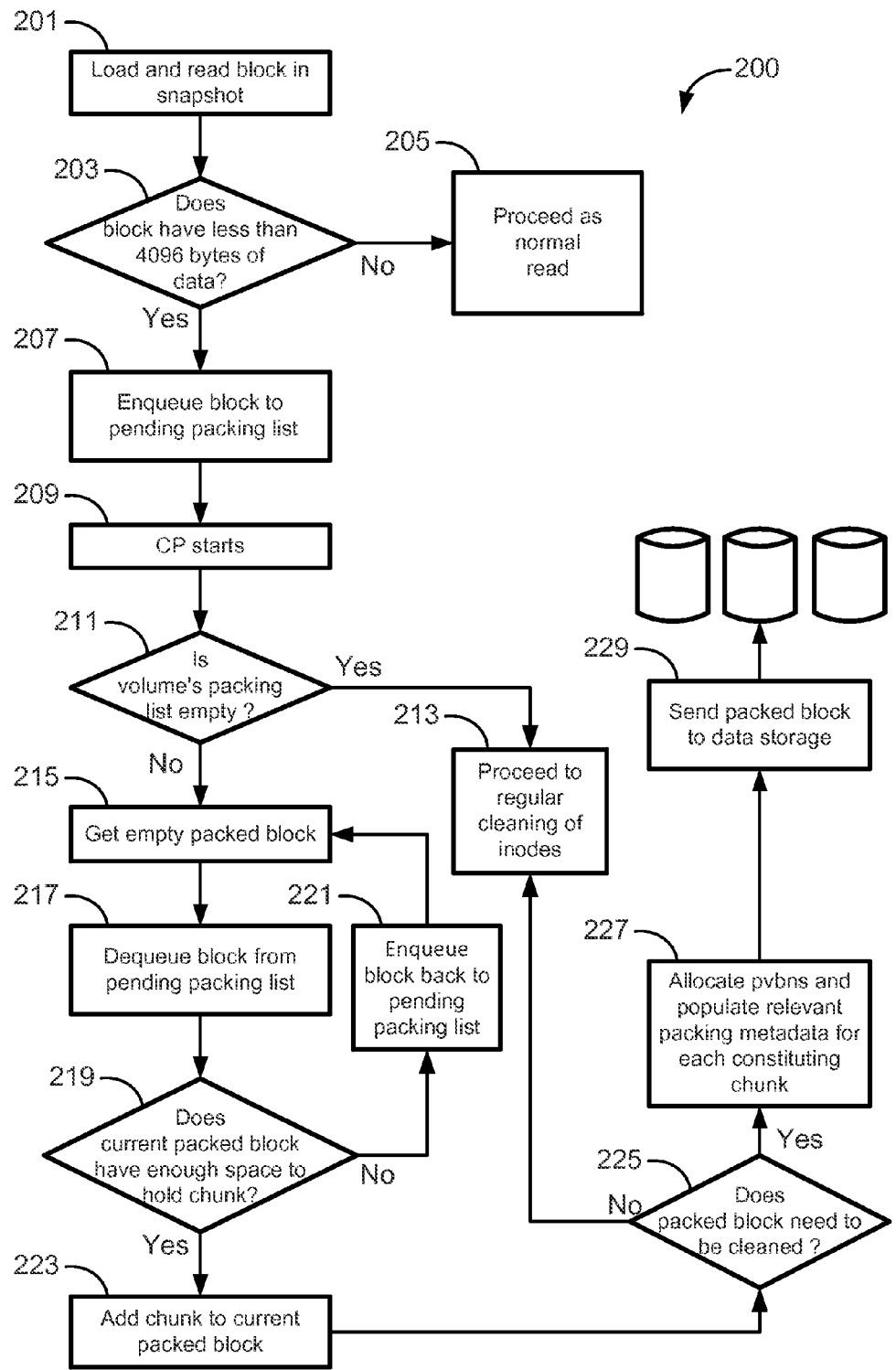
FIG. 3 is a flow chart illustrating a representative method or work flow process for packing data of multiple snapshots in a mass data storage filing system in accordance with aspects of the present disclosure.

With reference now to the flow chart of FIG. 3, there is shown a novel method or work flow process, designated generally as 200, for packing data of multiple snapshots in a mass data storage filing system. FIG. 3 can be indicative of a method for identifying, collecting, packing and writing snapshot blocks of data into a single packed block. FIG. 3 can be representative of an algorithm that corresponds to instructions that are stored, for example, in a main memory and executed, for example, by a controller/central processing unit, for example, of a host storage server to perform any or all of the above or below described functions associated with the disclosed concepts. The method 200 is described with reference to the various aspects and features shown in FIGS. 1 and 2 of the drawings; such reference is being provided purely by way of explanation and clarification.

The method 200 begins at block 201 with loading and reading one or more data blocks in a snapshot data file. Since the snapshot has already been written, there is no need for this operation to load and dirty a buffer for the read block(s), as compared to instances involving a write request to write a data file to the data storage system. A dirty buffer refers to blocks in the database buffer cache that are changed but not yet written to disk. At block 203, each snapshot data block is reviewed, e.g., by a Feeder Module 102 implemented through a storage server controller in the manner described above, to identify and collect sub-4K data chunks, if any, within the data block. If the data file does not have any sub-4K data chunks (Block 203=NO), the method 200 proceeds to block 205 to conduct a normal read of the snapshot file.

If the snapshot file does have at least one sub-4K data chunk (Block 203=YES), the method 200 proceeds to block 207 and enqueues the sub-4K data chunk(s) to a pending packing list, e.g., via Feeder Module 102 in the manner described above. At block 209, a consistency point (CP) process is started. To implement a consistency point, the file system allocates new block numbers and writes new data to unallocated blocks on disk. For example, a new consistency point occurs when the fsinfo block is updated by writing a new root inode for the inode file. The method 200 then determines, at block 211, if the volume packing list for a designated volume to which the data file is to be written is empty. If the volume's packing list is empty (Block 211=YES), the method 200 proceeds to block 213 with a regular cleaning of inodes.

With continuing reference to FIG. 3, if the volume's packing list is not empty (Block 211=NO), the method 200 proceeds to block 215 by identifying, e.g., by a Packing Engine Module 104 implemented through a storage server controller, a packed block, which can be in the nature of a 4K block designed to be packed with multiple sub-4K snapshot data chunks from a plurality of distinct snapshots and has available sufficient storage space to store any sub-4K data chunks in the subject snapshot file. In some instances, identifying a 4K block for packing comprises, for example, generating an entirely new packed block and respective metadata with a refcount for the packed block. Alternatively, identifying the packed block includes retrieving an existing packed block with respective metadata and refcount. Once a packable block is identified, the sub-4K snapshot block is dequeued from the pending packing list at block 217 and, concomitantly, it is determined at block 219 if the packable block has sufficient storage space available to store the dequeued snapshot data chunk. If said packable block does not have sufficient storage space available to store the dequeued snapshot chunk (Block 219=NO), the method 200 proceeds to block 221 and enqueues that sub-4K snapshot block back to the pending packing list and then returns to block 215 to find another snapshot block available for packing.

If the determination conducted at block 219 indicates that the packable block does have sufficient storage space available to store the dequeued snapshot chunk (Block 219=YES), the method 200 proceeds to block 223 and places, e.g., by a Block Writing Module 106 implemented through a storage server controller, the dequeued sub-4K snapshot chunk in the packed block, and updates the packed data header to include a corresponding data length and a respective offset identifying the location of the newly packed data chunk within the packed block. Subsequently, at block 225, the method 200 determines if the packed block needs to be cleaned; if not (Block 225=NO), the method will proceed to regular cleaning of inodes, as indicated at block 213.

Conversely, if the packed block does need to be cleaned (Block 225=YES), disk block numbers are allocated and the data is flushed to disk. Physical volume block numbers (PVBNS) are allocated for the constituting chunks in the packed block at block 227. Concomitantly, the storage controller updates the container file associated with the storage volume in the data file system to include the PVBN for the packed block. This may further comprise modifying a block pointer in the container file to create a stale mapping in a flexible volume (flexvol) for the packed block. A fix-up scanner, which is operable to bring the flexvol and the storage volume of the container into synchronization, is then run after updating the container file to include the PVBN for the packed block. The container file is also updated to include indirect entries corresponding to shared virtual volume block numbers (VVBNS) for all of the data chunks stored in the packed block. The storage controller frees indirect physical volume block numbers (PVBNS) of the packed block in the VVOL. Block 227 also includes populating the packed block with relevant metadata for each chunk and, at block 229, the packed block is sent to disk.

In some embodiments, the method 300 includes at least those steps enumerated above, carried out in the order illustrated in FIG. 3. It is also within the scope and spirit of the present disclosure to omit steps, include additional steps, and/or modify the order presented in the drawings. In this regard, the method 300 may include any of the features, options, and alternatives described above and below.

Figure 4:
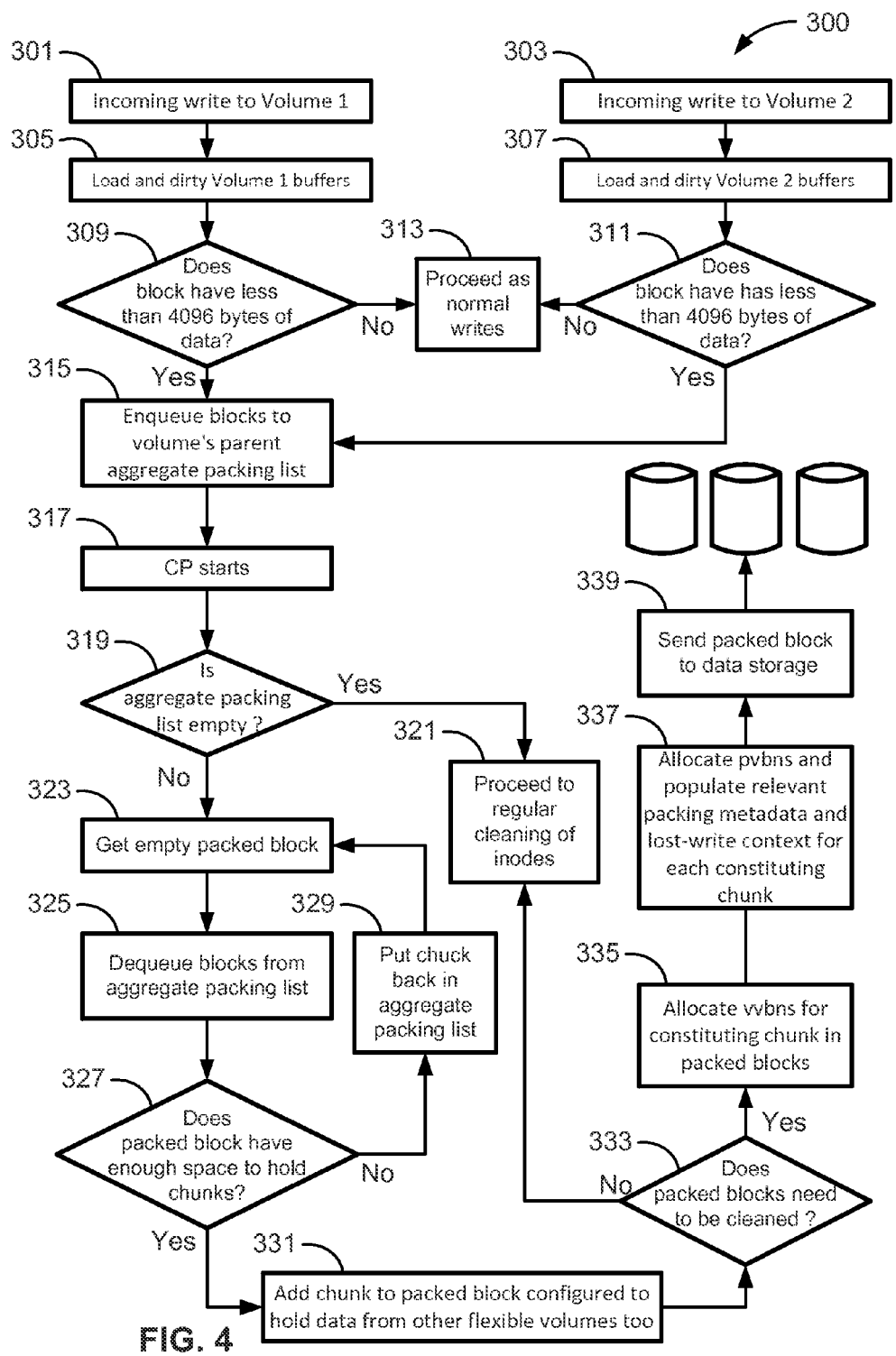
FIG. 4 is a flow chart illustrating a representative method or work flow process for packing files containing unique data across multiple flexible volumes in a mass data storage filing system in accordance with aspects of the present disclosure.

With reference now to the flow chart of FIG. 4, there is shown a novel method or work flow process, designated generally as 300, for sharing data blocks among files containing unique data across multiple flexible volumes in a mass data storage filing system. FIG. 4 can be indicative of a method for identifying, collecting, packing and writing blocks of unique data from disparate VVOLS in a data storage file system. FIG. 4 can be representative of an algorithm that corresponds to instructions that are stored, for example, in a main memory and executed, for example, by a controller/central processing unit, for example, of a host storage server to perform any or all of the above or below described functions associated with the disclosed concepts. The method 300 is described with reference to the various aspects and features shown in FIGS. 1 and 2 of the drawings; such reference is being provided purely by way of explanation and clarification.

Method 300 of FIG. 4 begins at blocks 301 and 303 with receiving, e.g., by a host storage server, a first write request to write a first data file constituting first data to a first virtual volume (block 301) and a second write request to write a second data file constituting second data to a second virtual volume (block 301). For some implementations, the first and second VVOLS are discrete flexible volumes in a common aggregate, and one or more data chunks in the first data file are distinct from the data in the second data file. After the two incoming write requests are received, the method 300 loads and dirties one or more Volume 1 buffers for the first write request, as indicated at block 305, and concomitantly loads and dirties one or more Volume 2 buffers for the second write request, as indicated at block 307. At this juncture, the file system does not write any of the dirty buffers to disk, but instead waits until execution of a consistency model event, e.g., a consistency point (CP), of the system. Blocks 309 and 311, e.g., via Feeder Module 102, review the incoming data files to identify and collect sub-4K data chunks, if any, within the data file. If either of the data file does not have a sub-4K data chunk (Blocks 309 and 311=NO), the method 300 proceeds to block 313 to conduct a normal write of the first and second data files to disk.

In instances where both data files have at least one sub-4K data chunks (Blocks 309 and 311=YES), the method 300 proceeds to block 315 and enqueues, e.g., via Feeder Module 102, the sub-4K data chunks from the first and second data files to a parent aggregate packing list of the two VVOLS. At block 317, a consistency point (CP) process is started. To implement this consistency point process, the file system allocates new block numbers to the incoming writes, and writes the new data to unallocated blocks on disk. For example, this new consistency point occurs when the fsinfo block is updated by writing new root inodes for both of the inode files. The method 300 then determines, at block 319, if the aggregate packing list for the write-request-designated volume to which the data files are to be written is empty. If the aggregate packing list is empty (Block 319=YES), the method 300 proceeds to block 321 with a regular cleaning of inodes.

With continuing reference to FIG. 4, if the aggregate packing list is not empty (Block 319=NO), the method 300 proceeds to block 323 by identifying, e.g., via Packing Engine Module 104, a 4K packed block that can be packed with multiple sub-4K data chunks and has available sufficient storage space to store the sub-4K data chunk(s) in the subject data file. Identifying a 4K block for packing may comprise, for example, creating a new packed block and a respective index node (inode) with a refcount for the packed block. Once a packable 4K block is identified, the sub-4K block is dequeued from the pending packing list at block 325 and, concomitantly, it is determined at block 327 if the packable 4K block has sufficient storage space available to store the multiple dequeued data chunks. If said 4K block does not have sufficient storage space available to store all of the dequeued data chunk (Block 327=NO), the method 300 proceeds to block 329 and enqueues that sub-4K block back to the aggregate packing list and then returns to block 323 to find another 4K block available for packing.

If the determination conducted at block 329 indicates that the packable 4K block does have sufficient storage space available to store the dequeued data chunk (Block 329=YES), the method 300 proceeds to block 331 and places, e.g., via Block Writing Module 106, the dequeued sub-4K data chunks in the 4K packed block, and updates the packed data header to include a corresponding data length and a respective offset identifying the location of the newly packed data chunks within the packed block. Subsequently, at block 333, the method 300 determines if the packed block needs to be cleaned; if not (Block 333=NO), the method will proceed to regular cleaning of inodes, as indicated at block 321. Conversely, if the packed block does need to be cleaned (Block 333=YES), disk block numbers are allocated and the data is flushed to disk. That is, virtual volume block numbers (VVBNS) are allocated for the constituting chunks in the packed block at block 335, and physical volume block numbers (PVBNS) are allocated for the constituting chunks in the packed block at block 337. Block 331 also includes populating the packed block with relevant meta data for each chunk and, at block 339, the packed block is sent to disk.

In some embodiments, the method 300 includes at least those steps enumerated above, carried out in the order illustrated in FIG. 4. It is also within the scope and spirit of the present disclosure to omit steps, include additional steps, and/or modify the order presented in the drawings. In this regard, the method 300 may include any of the features, options, and alternatives described above and below.

The following exemplary features and configurations are not intended to represent every embodiment or every aspect of the present disclosure. The above features and advantages, and other features and advantages of the present disclosure, will become more readily apparent from the following examples. In this regard, each of the disclosed systems, methods, devices, protocols, etc., including those illustrated in the figures, may comprise any of the features, options, and alternatives described herein with respect to the other embodiments, singly and in any combination, unless explicitly disclaimed or logically prohibited.

Aspects of the present disclosure are directed to methods for storing data blocks in mass data storage file systems. For example, a method for compressing snapshot data in a file system is presented. This method includes, in any order and in any combination with any of the optional features disclosed herein: loading, by a storage controller implementing a file system protocol, a snapshot data file comprising at least one snapshot data block, the snapshot representing the state of the data file system at a particular point in time; determining, by the storage controller, whether the snapshot data block is less than a predetermined byte value (e.g., less than approximately four kilobytes (KB)); responsive to the snapshot data block having a size that is less than the predetermined byte value, identifying a packed block that is configured to store data chunks from multiple distinct snapshots and has available sufficient storage space to store the snapshot data block; and adding, by the storage controller in the packed block, the snapshot data block and lost-write context information corresponding to the snapshot data block.

The methods disclosed herein may further comprise updating a container file, which is associated with a storage volume in the data file system, to include a physical volume block number (PVBN) for the packed block. Updating this container file may require modifying a block pointer in the container file to create a stale mapping in a flexible volume (flexvol) for the packed block. Methods disclosed herein may also comprise running a fix-up scanner after updating the container file to include the PVBN for the packed block. This fix-up scanner is operable to bring the flexvol and the storage volume of the container into synchronization. The methods disclosed herein may further comprise updating the container file to include indirect entries corresponding to shared virtual volume block numbers (VVBNS) for all of the data chunks stored in the packed block. Optionally, the methods disclosed herein may comprise freeing an indirect physical volume block number (PVBN) of the packed block in a virtual volume (vvol) within the data file system.

For any of the disclosed methods, identifying the packed block may include retrieving an existing packed block with respective metadata and refcount information. Additionally or alternatively, an entirely new packed block is generated with respective metadata and refcount information for the packed block. Any of the disclosed methods may optionally include enqueuing the snapshot data block to a pending packing list in response to said snapshot data block having a size that is less than the predetermined byte value. Other optional steps include: determining whether a volume packing list, which is associated with the storage volume within which is stored the packed block, is empty; if the volume packing list is empty, cleaning inodes for the packed block; and, if the aforementioned volume packing list is not empty, obtaining an empty packed block for the identified packed block. In addition, if the volume packing list is empty, the method may require dequeuing the snapshot data block from the pending packing list after obtaining the empty packed block.

Any of the disclosed methods may also include the following: prior to adding the snapshot data block, determining whether the packed block has sufficient storage space available to store the snapshot data block; and if the packed block does not have available sufficient storage space, enqueuing the snapshot data block back to the pending packing list. In this instance, adding the snapshot data block to the packed block is responsive, at least in part, to the volume packing list being empty and the packed block having available sufficient storage space. Optionally, any of the disclosed methods may require writing the packed block to a storage module of the data file system after the snapshot data block is placed in the packed block and the packed block is substantially or completely filled with data chunks.

Other aspects of the present disclosure are directed to non-transitory machine-readable media having stored thereon instructions for performing methods comprising machine executable code. In one example, the machine-readable code, when executed by a controller of a storage server in a data storage system, causes the storage server to: load a snapshot data file comprising one or more snapshot data blocks, the snapshot representing the state of the data file system at a particular point in time; determine whether at least one of the snapshot data blocks is less than a predetermined byte value (e.g., less than approximately 4 KB); responsive to the snapshot data block having a size that is less than the predetermined byte value, identify a packed block that is configured to store therein multiple data chunks from multiple distinct snapshots and has available sufficient storage space to store the snapshot data block; and, add to the packed block the snapshot data block and lost-write context information corresponding to the snapshot data block.

According to yet other aspects of the presented disclosure, mass data storage systems are disclosed. In an example, a storage server computing device for a data file system with one or more storage modules is presented. The storage server computing device includes a memory device that contains machine-readable media with machine-executable code. This code includes instructions for performing a method of compressing snapshot data in the data file system. The storage server computing device also includes a server processor that is coupled to the memory device. This processor is configured to execute the machine-executable code to cause the processor to: load a snapshot comprising at least one snapshot data block, the snapshot representing a state of the data file system at a point in time; determine whether the at least one snapshot data block has a size less than a predetermined byte value; responsive to the at least one snapshot data block having a size less than the predetermined byte value, identify a packed block configured to store data chunks from a plurality of distinct snapshots and having available sufficient storage space to store the at least one snapshot data block; and add to the packed block the at least one snapshot data block and lost-write context information corresponding to the at least one snapshot data block.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and aspects.

What is claimed:

1. A method comprising:
    loading, by a storage controller implementing a file system protocol, a snapshot comprising at least one snapshot data block, the snapshot representing a state of the data file system at a point in time;
    determining, by the storage controller, whether the at least one snapshot data block has a size less than a predetermined byte value;
    responsive to the at least one snapshot data block having a size less than the predetermined byte value, identifying a packed block configured to store data chunks from a plurality of distinct snapshots and having available sufficient storage space to store the at least one snapshot data block; and
    adding into the packed block, by the storage controller, the at least one snapshot data block and lost-write context information corresponding to the at least one snapshot data block.

2. The method of claim 1, further comprising updating, by the storage controller, a container file associated with a storage volume in the data file system to include a physical volume block number (PVBN) for the packed block.

3. The method of claim 2, wherein the updating the container file includes modifying a block pointer in the container file to create a stale mapping in a flexible volume (flexvol) for the packed block.

4. The method of claim 3, further comprising running a fix-up scanner after updating the container file to include the PVBN for the packed block, the fix-up scanner being operable to bring the flexvol and the storage volume of the container into synchronization.

5. The method of claim 2, further comprising updating the container file to include indirect entries corresponding to shared virtual volume block numbers (VVBNS) for all of the data chunks stored in the packed block.

6. The method of claim 2, further comprising freeing, by the storage controller, an indirect physical volume block number (PVBN) of the packed block in a virtual volume (vvol) within the data file system.

7. The method of claim 1, wherein the identifying the packed block includes retrieving an existing packed block with a header storing lost-write context information and a reference count.

8. The method of claim 1, wherein the identifying the packed block includes creating a new packed block with a header storing lost-write context information and a reference count for the packed block.

9. The method of claim 1, wherein the packed block includes a header configured to store metadata for all of the snapshot data chunks stored in the packed block, the metadata including a respective data length and offset for each of the stored snapshot data chunks.

10. The method of claim 1, further comprising enqueuing, by the storage controller in response to the at least one snapshot data block having a size less than the predetermined byte value, the at least one snapshot data block to a pending packing list.

11. The method of claim 1, further comprising:
determining whether a volume packing list is empty, the volume packing list being associated with a storage volume within which is stored the packed block;
if the volume packing list is empty, cleaning inodes for the packed block; and
if the volume packing list is not empty, obtaining an empty packed block for the identified packed block.

12. The method of claim 11, further comprising, if the volume packing list is empty, dequeuing the at least one snapshot data block from a pending packing list after obtaining the empty packed block.

13. The method of claim 12, further comprising:
determining whether the packed block has sufficient storage space available to store the at least one snapshot data block; and
if the packed block does not have available sufficient storage space, enqueuing the at least one snapshot data block back to the pending packing list,
wherein the adding the at least one snapshot data block to the packed block is responsive, at least in part, to the volume packing list being empty and the packed block having available sufficient storage space.

14. The method of claim 1, further comprising writing the packed block to a storage module of the data file system.

15. A non-transitory machine-readable medium having stored thereon instructions for performing a method comprising machine-executable code which, when executed by a controller of a storage server in a data file system, causes the storage server to:
load a snapshot comprising at least one snapshot data block, the snapshot representing a state of the data file system at a point in time;
determine whether the at least one snapshot data block has a size less than a predetermined byte value;
responsive to the at least one snapshot data block having a size less than the predetermined byte value, identify a packed block configured to store data chunks from a plurality of distinct snapshots and having available sufficient storage space to store the at least one snapshot data block; and
add to the packed block the at least one snapshot data block and lost-write context information corresponding to the at least one snapshot data block.

16. The non-transitory machine-readable medium of claim 15, wherein the stored instructions further cause the storage server to update a container file associated with a storage volume in the data file system to include a physical volume block number (PVBN) for the packed block.

17. The non-transitory machine-readable medium of claim 16, wherein the updating the container file includes modifying a block pointer in the container file to create a stale mapping in a flexible volume (flexvol) for the packed block.

18. The non-transitory machine-readable medium of claim 16, wherein the stored instructions further cause the storage server to update the container file to include indirect entries corresponding to shared virtual volume block numbers (VVBNS) for all of the data chunks stored in the packed block.

19. The non-transitory machine-readable medium of claim 16, wherein the stored instructions further cause the storage server to free an indirect physical volume block number (PVBN) of the packed block in a virtual volume (vvol) within the data file system.

20. A storage server computing device for a data file system, the storage server computing device comprising:
a memory containing machine-readable media comprising machine-executable code having stored thereon instructions for performing a method for storing snapshot data in the data file system;
a processor coupled to the memory, the processor configured to execute the machine-executable code to cause the processor to:
load a snapshot comprising at least one snapshot data block, the snapshot representing a state of the data file system at a point in time;
determine whether the at least one snapshot data block has a size less than a predetermined byte value;
responsive to the at least one snapshot data block having a size less than the predetermined byte value, identify a packed block configured to store data chunks from a plurality of distinct snapshots and having available sufficient storage space to store the at least one snapshot data block; and
add to the packed block the at least one snapshot data block and lost-write context information corresponding to the at least one snapshot data block.

* * * * *